(12) United States Patent
Feldman

(10) Patent No.: US 6,607,270 B2
(45) Date of Patent: Aug. 19, 2003

(54) CLIP-ON ACCESSORY FOR EYEGLASSES

(75) Inventor: Zvi Feldman, Zoran (IL)

(73) Assignee: Opti-Clip International LLC, Boca Raton, FL (US)

( * ) Notice: Subject to any disclaimer, the term of this patent is extended or adjusted under 35 U.S.C. 154(b) by 0 days.

(21) Appl. No.: 09/991,868

(22) Filed: Nov. 26, 2001

(65) Prior Publication Data
US 2003/0098948 A1 May 29, 2003

(51) Int. Cl.⁷ ................................................. G02C 9/00
(52) U.S. Cl. .......................................... 351/47; 351/57
(58) Field of Search ................................ 351/47, 48, 57, 351/58, 110

(56) References Cited

U.S. PATENT DOCUMENTS

| 5,367,344 | A | * | 11/1994 | Fuchs | 351/41 |
|---|---|---|---|---|---|
| 5,694,192 | A | | 12/1997 | Lucki et al. | 351/47 |
| 5,724,118 | A | | 3/1998 | Krebs | 351/57 |
| 5,889,574 | A | | 3/1999 | Gandl-Schiller | 351/47 |
| 5,936,702 | A | * | 8/1999 | Cheong | 351/141 |
| 6,089,706 | A | | 7/2000 | Pilat, Jr. | 351/47 |
| 6,116,731 | A | | 9/2000 | Fuchs | 351/47 |
| 6,196,679 | B1 | | 3/2001 | Wong | 351/47 |
| 6,234,628 | B1 | | 5/2001 | Freidman | 351/48 |
| 6,244,704 | B1 | | 6/2001 | Xiao | 351/47 |
| 6,254,232 | B1 | | 7/2001 | Friedman | 351/47 |
| 6,280,029 | B1 | * | 8/2001 | Salk | 351/47 |
| 6,293,671 | B1 | * | 9/2001 | Masunaga | 351/47 |
| 6,341,864 | B1 | * | 1/2002 | Ng | 351/47 |
| 6,354,702 | B2 | * | 3/2002 | Via | 351/47 |
| 6,398,362 | B1 | * | 6/2002 | Masunaga | 351/47 |

FOREIGN PATENT DOCUMENTS

| EP | 1 118 898 A1 | * | 7/2001 |
|---|---|---|---|
| WO | WO 97/19384 | * | 5/1997 |

* cited by examiner

Primary Examiner—Huy Mai
(74) Attorney, Agent, or Firm—Morgan, Lewis & Bockius LLP

(57) ABSTRACT

A clip-on mountable on the frame of eyeglasses having a pair of optical visual-correction lenses. The clip-on is provided with a pair of filter lenses held together by a bridge, the filter lenses registering with the optical lenses to convert the eyeglasses into radiation-protection glasses, such as sunglasses. Anchored on the margin of each filter lens is at least one clip having a ledge at one end which supports the margin of the lens, and an arm at the other end that curves over the frame at the corresponding optical lens to retain the clip-on. Intermediate the ends of the clip is a transverse hook which engages the margin of the filter lens to resist dislodgment of the clip.

18 Claims, 4 Drawing Sheets

CLIP-ON ACCESSORY FOR EYEGLASSES

FIELD OF THE INVENTION

This invention relates generally to a clip-on accessory having a pair of filter lenses which register with a pair of optical lenses in eyeglasses when the clip-on accessory is mounted on the frame of the eyeglasses. More particularly, the invention resides in a clip for a clip-on accessory which is anchored on the margin of a filter lens and includes a hook which engages this lens to resist dislodgment of the clip.

STATUS OF PRIOR ART

A conventional pair of eyeglasses is provided with optical lenses which are prescribed for the wearer of the eyeglasses to correct for visual eye defects. These optical lenses are usually fitted into a metal or plastic frame to which temple pieces are hinged. A wearer of prescription eyeglasses may on occasion find it necessary to protect his eyes from harmful radiation, such as intense rays emanating from the sun, strong light emanating from a welding arc or from a laser beam instrument.

The wearer therefore requires radiation protection glasses having filter lenses which filter out the radiant energy for which the glasses are designed. Thus in the case of sunglasses the filter lenses may simply be formed by a smoked lens, while for other types of radiant energy, the filter lenses must be coated or otherwise treated to filter out this energy. But in all cases, radiation protection eyeglasses for a wearer requiring corrective lenses must have filter lenses having the same optical properties as those of the wearer's regular prescription eyeglasses.

The term filter lens as used herein in conjunction with a clip-on accessory is not limited to a lens having radiation filtration properties. It includes a lens having optical properties so that when this filter lens is placed before an optical lens of eyeglasses, it then combines therewith to form a compound lens for visual correction.

Prescription eyeglasses must be specially tailored to meet the visual requirements of its wearer and such eyeglasses are therefore costly. Should the wearer also require prescription radiation protection glasses, he is then faced with additional heavy costs.

But that is not the only drawback, for should the wearer have occasion in the course of a day to require both his regular prescription eyeglasses and his special prescription radiation protection glasses, then it becomes necessary for him to switch from one to the other and to pocket the glasses not then in use.

A significant advantage of a clip-on which converts a regular pair of eyeglasses to function as radiation-protection glasses is that when the clip-on is mounted on the eyeglasses, there is then nothing that has to be pocketed.

As shown in U.S. Pat. No. 5,889,574, a typical clip-on consists simply of a pair of rimless non-optical filter lenses joined together by a bridge, the lenses having clips anchored thereon adapted to engage the frame of eyeglasses to mount the clip-ons on the glasses. In this patent the clips are attached to the filter lenses by screws.

The use of screws in eyeglasses is commonplace, screws being included in the temple piece hinge as well as in the frame to hold the optical lenses in place. With continued use, it is not an uncommon experience for a tiny screw to turn out its socket and to be misplaced, thereby disabling the eyeglasses. This is also the problem with screws which hold clips onto the lens of a clip-on, for with continued use, the clips may become unscrewed.

A significant aspect of a clip in accordance with the invention is that no screws are required to anchor the clips on the filter lenses of the clip-on, hence there is no unscrewing problem.

U.S. Pat. No. 6,234,628 shows a pair of clip-on sunglasses whose lenses are in a frame having L-shaped plastic prongs to couple the clip-on onto the frame of spectacles. These prongs are not attached to rimless lenses as in a clip-on in accordance with the invention.

U.S. Pat. No. 5,724,118 shows a clip-on having lenses mounted in rings to which hooks are cemented or welded for connecting the clip onto the frame of spectacles. A coupling clip in accordance with the invention is not welded or cemented to the lenses.

U.S. Pat. No. 6,089,706 shows a clip-on whose lenses are held in a wire frame. The wire goes through hooks to attach the clip-on to the frame of eyeglasses. Hence it is the frame wire that holds the coupling clips in place, a very different arrangement from the plug-anchored coupling clips of the present invention.

U.S. Pat. No. 6,254,232 shows spring-biased clamping arms which act to clamp a clip onto the frame of eyeglasses. This is a far cry from the present arrangement.

U.S. Pat. No. 6,116,731 effects a connection between sunglasses and optical eyeglasses by means of plug-in projections. Along similar lines are the projections shown in U.S. Pat. No. 6,196,679. But these projections are not in the manner of the present invention associated with a hook that engages the margin of a filter lens to prevent the clip from detaching therefrom.

U.S. Pat. No. 5,694,192 discloses a clip-on whose coupling clips are joined to lenses by a tension thread, not by anchoring plugs. U.S. Pat. No. 6,244,704 welds clips 13A and 14A onto the lenses of a clip-on.

SUMMARY OF THE INVENTION

In view of the foregoing, the main object of this invention is to provide a clip-on for a pair of eyeglasses, the clip-on having filter lenses in which clips are anchored to mount the clip-on onto the frame of the eyeglasses, which clips are capable of withstanding the stresses arising from repeated use of the clip-on without becoming detached from the filter lenses. In those instances where the eyeglasses are rimless, that is one whose lenses are not mounted in a frame, then the clips are anchored onto the margin of these lenses.

Among the significant advantages of the invention are the following:

A. No screws are used to hold together the components of the clip-on, hence there is no problem of screw loosening.

B. The clips are readily attachable to the filter lenses of the clip-on thereby simplifying manufacturing procedures.

C. The clips may be mass-produced at relatively low cost.

More particularly an object of this invention is to provide a clip-on which is coupled to the margin of a filter lens at a first position displaced inwardly from the edge of the lens and at a second position adjacent the edge, which couplings act to resist detachment of the clip.

Briefly stated, these objects are accomplished by a clip-on mountable onto the frame of eyeglasses having a pair of optical-visual-correction lenses. The clip-on is provided with a pair of filter lenses held together by a bridge, the filter lenses registering with the optical lenses to convert the eyeglasses into radiation-protection glasses such as sunglasses. Anchored on the margin of each filter lens is at least one clip having a ledge at one end which supports the margin of the lens and an arm at the other end that curves over the frame of the corresponding optical lens to retain the clip-on. Intermediate the ends of the clip on the leg thereof is a transverse hook which engages the margin of the filter lens to resist dislodgment of the clip.

BRIEF DESCRIPTION OF THE DRAWINGS

For a better understanding of the invention as well as other objects thereof, reference is made to the annexed drawings wherein.

DETAILED DESCRIPTION OF THE INVENTION

Figure 1:
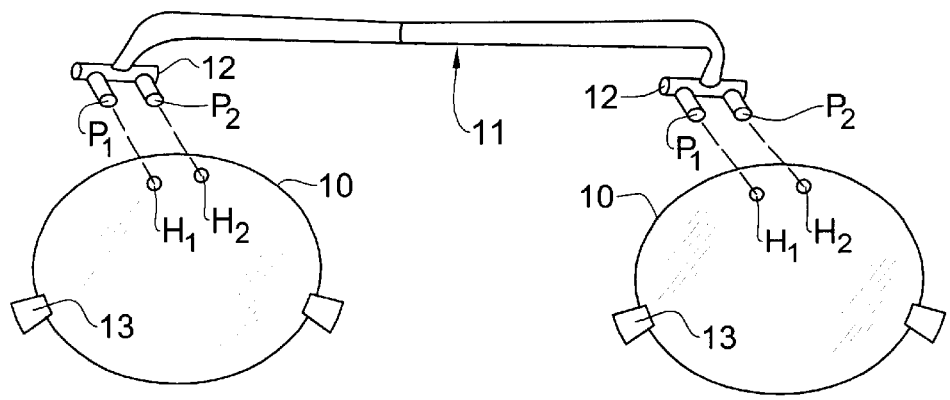
FIG. 1 is an exploded view of a clip-on having clips in accordance with the invention.
Figure 2:
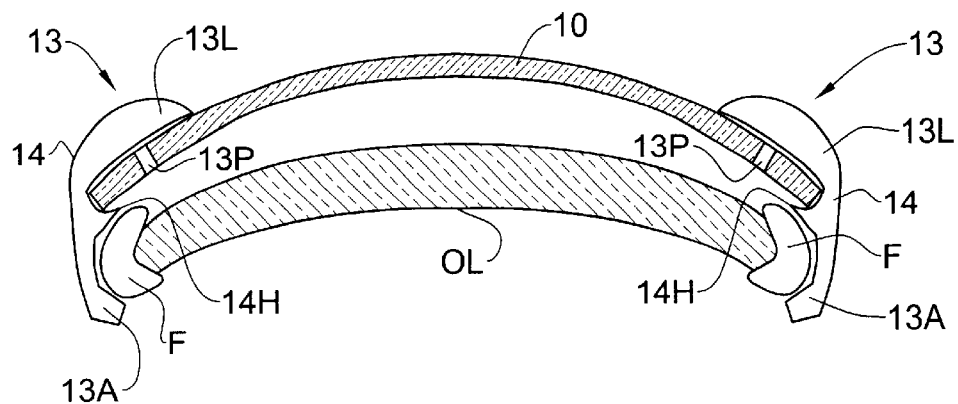
FIG. 2 illustrates the relationship between a filter lens on the clip-on and an optical lens on a pair of eyeglasses on whose frame the clip-on is mounted.

Referring now to FIGS. 1 and 2, shown therein is a clip-on in accordance with the invention that is mountable on the frame F of prescription eyeglasses having a pair of optical lenses OL. The clip-on includes a pair of filter lenses 10 having radiation-protection properties, these lenses being molded of synthetic-plastic transparent material which is dyed or otherwise processed to impart the desired filtration properties thereto. Thus, when the clip-on acts to convert the eyeglasses to sunglasses, the filter lenses are then dyed a grey or smoky color to impede the rays of the sun and protect the eyes of the wearer.

Filter lenses 10 are supported at opposite ends of a bridge piece 11, each end of which is joined to a yoke 12 from which projects a pair of prongs P1 and P2. These prongs are adapted to be press-fitted into a pair of holes H1 and H2 drilled in the margin of each filter lens 10 at the upper end thereof, so that the filter lenses are firmly secured to opposite ends of bridge piece 11.

An eyeglass frame is composed of a pair of half sections joined together by a nosepiece, an optical lens being mounted in each half section. The shape of filter lens 10 is similar to the shape of a half section of frame F. Hence when as shown in FIG. 2, the clip-on is mounted on frame F of the eyeglasses, filter lens 10 is then in full registration with optical lens OL. While FIG. 1 shows filter lens 10 having an oval shape it may have other shapes, for the design of modern eyeglasses is now such as to range from circular lenses to those having many variants of a circular shape. Anchored on each filter lens 10 on the margin thereof on opposite sides thereof is a pair of molded plastic clips 13.

Clip 13 is provided at the foot end of a leg 14 with a ledge 13L on which is anchored the margin of filter lens 10 by means of a plug 13P that is press-fitted into a hole drilled in the margin. At the other end of leg 14 is an arm 13A that is curved to conform to the contours of frame F of the eyeglasses, so that the clip serves to mount the clip-on onto the frame of the spectacles.

Intermediate ledge 13L at one end of clip 13 and arm 13 at the other end thereof is transverse hook 14 which projects inwardly from leg 14 to overlie the margin of filter lens 10 to resist dislodgment of the clip.

In the arrangement shown in FIG. 2, the thickness of filter lens 10 is such that transverse hook 14 is just behind this lens to overlie its margin. But when the clip is joined to a thicker lens, then the peak of hook 14 digs into the edge of the lens to resist dislodgment of the clip.

It must be borne in mind that when a clip-on is subjected to frequent use so that it is often mounted and demounted from a pair of eyeglasses, each time this happens the clips which clip onto the frame of the glasses are subjected to stresses and torsion forces that seek to detach the clip from the filter lens.

Such detachment is resisted by the clip which is attached by its ledge to the margin of the filter lens and which by means of its transverse hook which overlies the margin resists torsional forces which seek to twist the clip off the lens.

Figure 3:
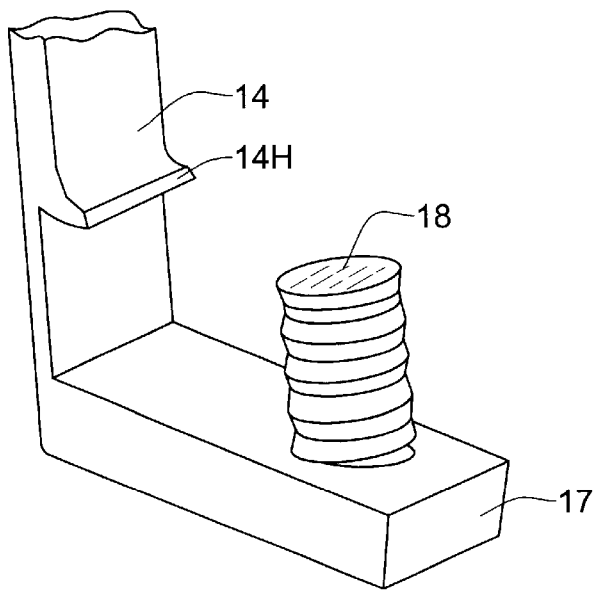
FIG. 3 is a perspective view of a clip in accordance with the invention.
Figure 4:
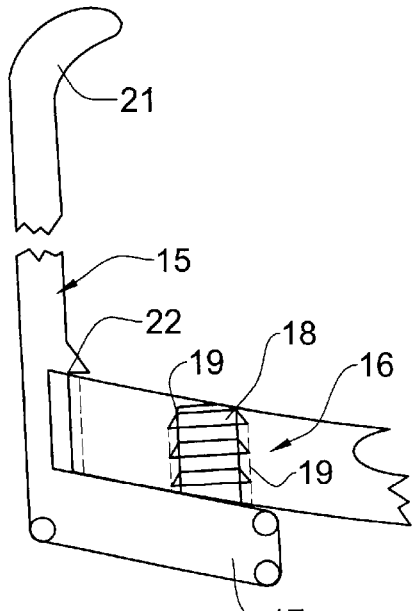
FIG. 4 shows this clip anchored on a filter lens.

FIGS. 3 and 4 are a separate view of a clip 15 in accordance with the invention in which the margin of a filter lens 16 rests on the ledge 17 and is anchored therein by a plug 18 projecting from the ledge into a hole 19 drilled in the margin of the lens.

Plug 18 is provided with a series of annular teeth 20 which cut into the bank of hole 19 to resist withdrawal of the plug from the hole. At the upper end of leg 15 of the clip is an arm 21 that curves inwardly to engage the frame of the spectacles. And the clip is provided on its leg with a transverse hook 22 which projects over the margin of lens 16. This clip arrangement and how it functions are essentially the same as that shown in FIG. 2.

Figure 5:
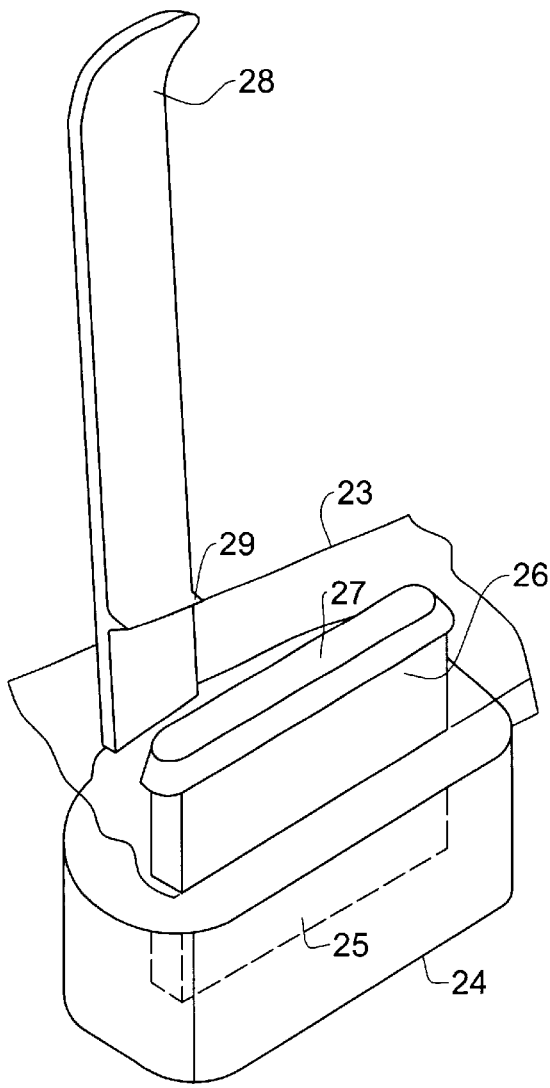
FIG. 5 shows a second embodiment of a clip in accordance with the invention.

In embodiment of the clip shown in FIG. 5, the filter lens 23 is clamped by the clip onto its ledge 24. To this end, ledge 24 is provided with a rectangular socket 25 which receives a rectangular plug 26 that goes into the socket through a rectangular slot in lens 23. The flanged head 27 at the top of plug 26 engages the surface of the lens. This clip includes a curved arm 28 to engage the frame of the spectacles as in FIG. 4 and transverse hook 29.

Figure 6:
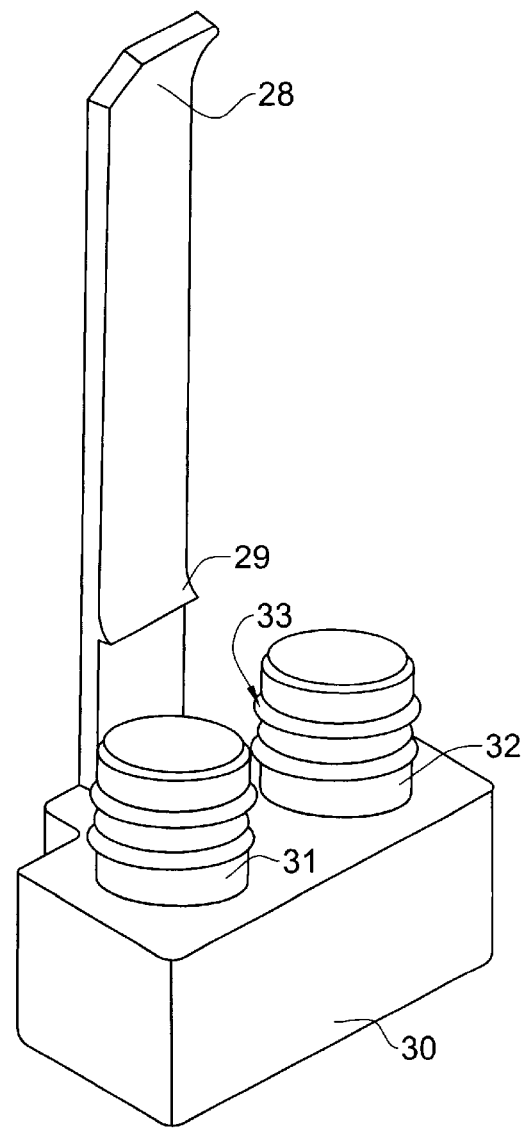
FIG. 6 shows a third embodiment thereof.

The clip shown in FIG. 6 has a pair of plugs 31 and 32 mounted on a ledge 30, the plugs having annular teeth 33 which dig into the bank of a hole in the lens seated on the ledge. In other respects, this clip is like the one shown in FIG. 5.

Figure 7:
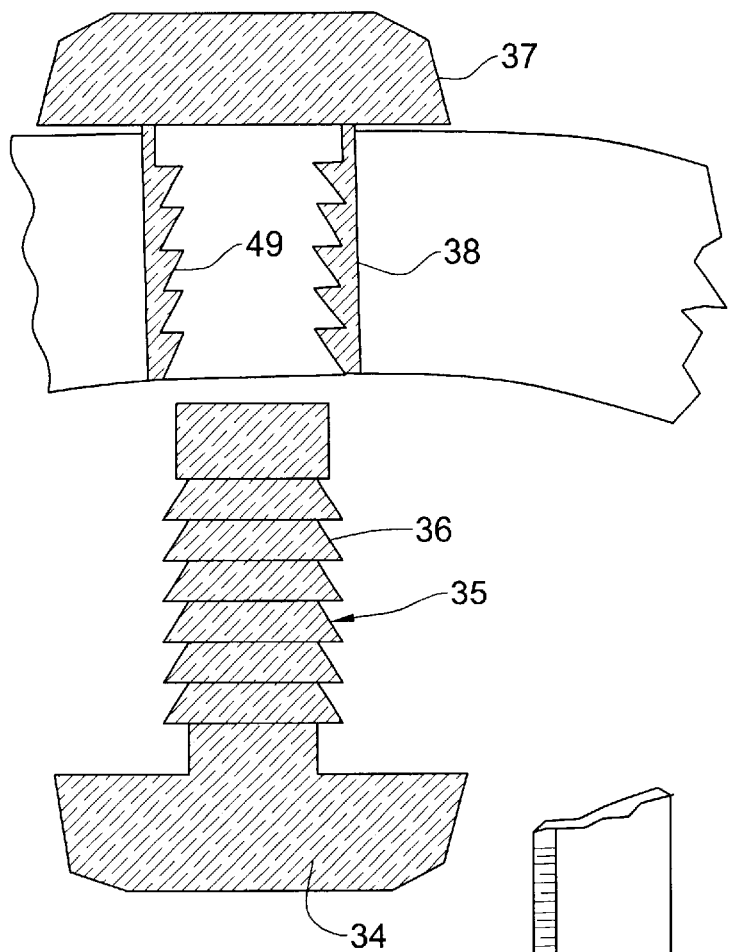
FIG. 7 shows a fourth embodiment.

In the clip shown in FIG. 7, its ledge 34 is provided with a plug 25. This plug is received in a hollow shank 38 of a bolt whose head 37 engages the surface of filter lens 39, the shank nesting in a hole drilled in the lens. The bank of hollow shank 38 is provided with annular teeth 40 which intermesh with plug teeth 36. This arrangement acts to clamp the clip onto the lens.

Figure 8:
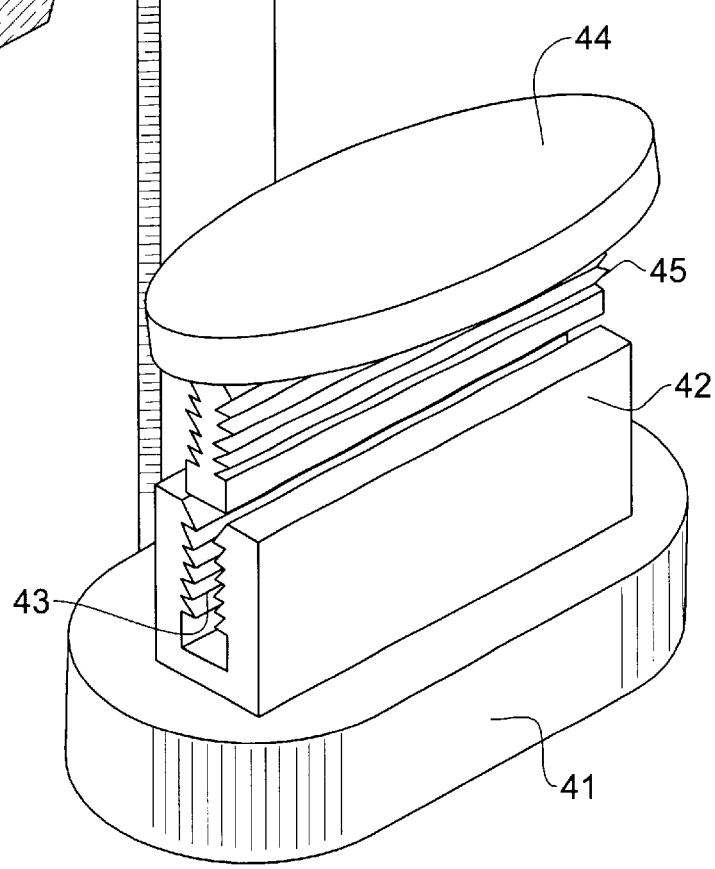
FIG. 8 shows a fifth embodiment and FIG. 9 illustrates a sixth embodiment of a clip in accordance with the invention.

Also clamping a clip onto the filter lens is the FIG. 8 arrangement in which a block-like plug 42 projects above the ledge 41 of the clip. Plug 42 has a slot 43 therein whose parallel wall each have formed thereon an array of parallel teeth. These teeth intermesh with the teeth of a rectangular shank 45 of a bolt 44 that is pressed into plug 42 to clamp the clip onto the lens.

Figure 9:
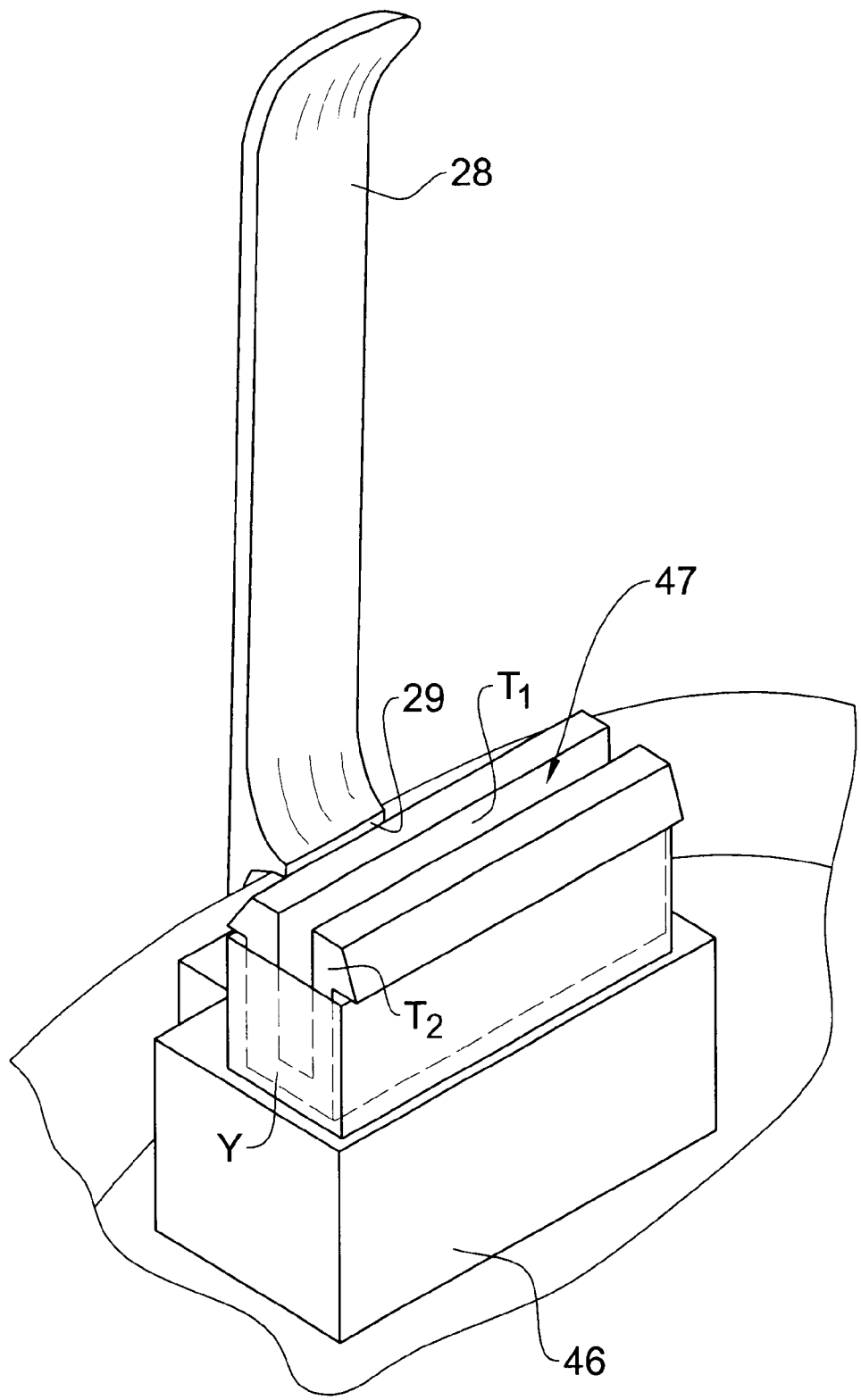

In the embodiment shown in FIG. 9, the clip includes a curved arm 28 at its upper end to engage the frame of a pair of eyeglasses just as in the FIG. 5 embodiment, and a transverse hook 29 on the arm of the clip to resist torsion forces which seek to twist the clip off the margin of the filter lens on which the clip is anchored.

To anchor this clip the ledge thereof is provided with a block-like socket 46 dimensioned to receive a generally rectangular plug 47 which goes into the socket through a like-shaped slot in the lens. Plug 47 has a U-shaped cross-section to define a pair of flexible tines T1 and T2 joined to a yoke Y The head of each tine is flanged to engage the surface of the filter lens when the plug is pressed into the socket of the clip.

While there has been shown preferred embodiments of a clip-on in accordance with the invention, it is to be understood that many changes and modifications may be made therein without departing from the spirit underlying the invention.

What is claimed is:

1. A clip-on accessory mountable on eyeglasses having a pair of optical lenses fitted onto a frame, said clip-on accessory comprising:

a pair of filter lenses for filtering out harmful radiation or for optical correction;

a bridge interconnecting the filter lenses to position those lenses in registration with the optical lenses when the accessory is mounted on the eyeglasses; and at least one clip anchored on a margin of a filter lens, each clip having a leg, a ledge at one end of the leg to support the margin of the filter lens, an arm at the other end of the leg that curves over the frame of the eyeglasses to retain the clip-on, and a small transverse hook, which is much shorter than the ledge, formed on the leg to engage the margin to resist dislodgment of the clip.

2. A clip-on as in claim 1, in which said bridge at either end thereof is provided with a yoke having a pair of prongs that are received in holes in the margin at the upper end of the filter lens.

3. A clip-on as in claim 1, in which said filter lens is molded of synthetic-plastic, transparent material.

4. A clip-on as in claim 3, in which said material is dyed to impart sun filtration properties thereto.

5. A clip-on as in claim 1, in which said filter lens have a shape which matches the shape of an optical lens.

6. A clip-on as set forth in claim 1, in which the clip is anchored on said margin by means which join the margin to said clip ledge.

7. A clip-on as in claim 6, in which said means is a plug projecting from said ledge into a hole drilled in said margin.

8. A clip-on as in claim 7, in which said plug is provided with a series of annular teeth, and said hole in the margin is provided with meshing teeth whereby when the plug is inserted into the hole to intermesh with the teeth, the plug is then locked in the hole.

9. A clip-on as in claim 6, in which the anchoring means is a pair of plugs that project from the ledge and are socketed in corresponding holes drilled in the margin of the filter lens.

10. A clip-on as set forth in claim 6, in which the anchoring means is a plug having a rectangular cross section that is received in a socket formed in the margin of the filter lens and having a like cross section.

11. A clip-on as set forth in claim 6, in which said anchoring means is a rectangular plug on either side of which is an array of parallel teeth, the plug being insertable into a rectangular socket formed on the ledge having parallel walls provided with a matching array of teeth to retain the plug in the socket.

12. A clip-on as set forth in claim 6, in which said anchoring means is a rectangular plug that is insertable into a rectangular socket formed on the ledge, said plug having a U-shaped cross-section to define a pair of tines joined to a yoke, each tine having a flanged head to engage the surface of the filter lens.

13. A clip-on accessory according to claim 1, further comprising a bore in said filter lenses, spaced apart from the margins thereof, and at least one plug on said clip adapted for being received within said bore, wherein the coupling of the clip on the lens is performed by inserting the plug in the bore by applying force in the direction transverse to faces of the filter lenses.

14. A clip-on accessory according to claim 13, wherein said plug is formed integrally with said ledge and is adapted to tightly fit into said bore.

15. A clip-on accessory according to claim 13, wherein said plug is formed integrally with said ledge and said anchoring arrangement further comprising a bolt adapted for being received in said bore and formed with a socket in its shank adapted to engagingly receive said plug therein.

16. A clip-on accessory according to claim 15, wherein said plug is provided with a series of annular teeth, and said socket is provided with meshing teeth, whereby when the plug is inserted into the socket to intermesh with the teeth, the plug is locked in the socket.

17. A clip-on accessory according to claim 16, wherein said plug and said socket have mating non-circular cross-sections, and said bolt and said bore having mating non-circular cross-sections.

18. A clip-on accessory mountable on eyeglasses having a pair of optical lenses fitted onto a frame, said clip-on accessory comprising:

a pair of filter lenses for filtering out harmful radiation or for optical correction;

a bridge interconnecting the filter lenses to position those lenses in registration with the optical lenses when the accessory is mounted on the eyeglasses;

at least one clip anchored on a margin of a filter lens, each clip having a leg, a ledge at one end of the leg to support the margin of the filter lens, an arm at the other end of the leg that curves over the frame of the eyeglasses to retain the clip-on, and a small transverse hook, which is much shorter than the ledge, formed on the leg to engage the margin to resist dislodgment of the clip, and wherein said filter lenses further include a bore, spaced apart from the rim thereof, and a plug on said clip adapted for being received within said bore, wherein the coupling of the clip on the lens is performed by inserting the plug in the bore by applying force in the direction transverse to faces of the filter lenses.

* * * * *